Patented Dec. 13, 1949

2,491,249

UNITED STATES PATENT OFFICE 2,491,249

WATER REPELLENT COMPOSITION CONTAINING STEARAMIDE AND METHYLATED METHYLOL MELAMINE

George I. Cathers, Old Greenwich, and Linton A. Fluck, Jr., Norwalk, Conn., assignors to American Cyanamid Company, New York, N. Y., a corporation of Maine No Drawing. Application April 30, 1945, Serial No. 591,236

1 Claim. (Cl. 260—29.4)

This invention relates to compositions of matter suitable for application to textiles to impart water-repellent properties thereto, and to an improved method for the preparation of such compositions. The invention includes the compositions themselves, their methods of preparation, and textile finishing processes involving the application of the compositions to textiles.

Within recent years a number of textile finishing compositions have been developed which will impart a high degree of water-repellency to textiles and textile-forming materials, particularly cotton cloth such as cotton percales and poplins. One very successful composition of this type consists essentially of an amide of a higher fatty acid, such as lauramide, stearamide and the like applied to the cloth in admixture with a water-soluble or water-dispersible resin-forming material such as an alkylated methylol melamine. Particularly good results have been obtained by applying stearamide in conjunction with water-soluble methylated methylol melamine. Compositions of this type and their methods of application to textiles are described in U. S. Patent No. 2,357,273 to J. T. Thurston.

It is a principal object of the present invention to provide a concentrated, self-dispersing textile finishing composition of the materials described in the Thurston patent which will be stable upon storage but easily diluted or dispersed by simple agitation with water to form finishing baths for textiles. A further object of the invention is the provision of a commercially practicable method or process for preparing such compositions continuously and at low cost. Additional objects of the invention will be apparent from a description of preferred embodiments thereof, when taken with the appended claims.

Considerable difficulty has been experienced in preparing compositions of the type described in the Thurston patent in the form of concentrates having good stability on storage and which can be diluted by the customer prior to use. The principal difficulty arose from the fact that organic solvents such as ethanol were used to dissolve the higher fatty acid amide prior to adding the resin-forming material. These solvents interfered with the water-repellency of the finished composition and also created a considerable fire hazard during storage of the material and particularly upon drying the impregnated cloth at elevated temperatures. The provision of a concentrated, water-repellent textile finishing composition containing substantially no organic solvent is one of the principal advantages of the invention.

Our present invention is based on the discovery that concentrated aqueous solutions of methylated methylol melamine possesses definite solvent properties for the amides of higher fatty acids, such as lauramide, stearamide, palmitamide and the like. We have found that clear, concentrated solutions are obtainable simply by heating the higher fatty acid amide with concentrated aqueous solutions of methylated methylol melamine at temperatures of about 180° F. or higher. Moreover, we have found that when this hot solution contains a small amount of a dispersing agent such, for example, as ordinary soap, the fatty acid amide can be obtained in a very finely divided form upon rapid cooling of the solution. The resulting composition, which consists essentially of a paste or suspension of finely divided higher fatty acid amide and dispersing agent in a concentrated aqueous methylated methylol melamine solution constitutes a new composition of matter having a number of important properties. Because of the fine particle size of the stearamide and the solvent properties of the methylated methylol melamine it is easily dilutable or dispersible in water, and therefore can be made into a textile finishing bath by simple dilution. Moreover, the composition is stable during shipment and storage and shows no tendency to cream or coagulate.

Although stable and easily dispersible compositions are obtainable by heating a mixture of higher fatty acid amide and a dispersing agent with methylated methylol melamine solutions, improved results are frequently obtained by adding a small quantity of ammonium hydroxide solution. This improves the storage properties of the dispersion and also helps to prevent excessive acidity after the dispersion has been made into a textile finishing bath containing a curing accelerator such as diammonium hydrogen phosphate. Approximately 5–10% of ammonium hydroxide (26% $NH_3$), based on the entire weight of the concentrated dispersion, may be used for this purpose.

Any suitable dispersing agent may be employed to assist in obtaining the higher fatty acid amide in finely divided form. Sodium isopropyl naphthalene sulfonate, sodium lauryl sulfate and similar synthetic detergents may be used if desired. However, the alkali metal salts or higher fatty acids such as sodium or potassium stearates have produced excellent results, and are preferred. The alkali metal stearates are particularly advantageous because commercial stearamide frequently contains about 4–8% of free stearic acid and the soap can be formed in situ merely by adding caustic soda or caustic potash Even better results are sometimes obtained, however, when mixtures of sodium potassium stearate and a synthetic detergent such as sodium isopropyl naphthalene sulfonate are used.

The ratios of the ingredients of our new composition are determined largely by the particular type of textiles to be treated. Thus, for example, for some purposes it is desirable to use only 15-25% of higher fatty acid amide, based on the amount of methylated methylol melamine, while for other purposes as much as 100-150% of the fatty acid amide are employed. It is an important advantage of our invention that as much as 150% of stearamide and other higher fatty acid amides can be dissolved in concentrated aqueous solutions of methylated methylol melamine; i. e., solutions can be prepared containing 1.5 parts by weight of higher fatty acid amide for each part of methylated methylol melamine. In general, therefore, about 6-30 parts by weight of a higher fatty acid amide such as stearamide are usually employed for each 20-40 parts of methylated methylol melamine. About 0.6-1.2 parts of sodium stearate or other dispersing agent are used with this mixture.

The concentrated aqueous solutions of methylated methylol melamine should contain at least about 35% of the methylated methylol melamine, and preferably about 45-60%. These are essentially water solutions, but may contain small quantities of methanol that are sometimes present in commercial batches of methylated methylol melamine. In preparing the compositions of our invention the methylated methylol melamine solution is preferably mixed with the higher fatty acid amide and sodium or potassium stearate and the mixture is heated rapidly to about 180-200° F. until a clear solution is obtained. This solution is then cooled with continuous agitation until the desired dispersion of fine particle size is formed, which usually occurs when the temperature reaches about 50° C. The ammonia may then be added if desired.

Typical compositions illustrative of our invention are obtained by mixing the following ingredients in the quantities indicated:

|  | Per cent | Per cent |
|---|---|---|
| Stearamide (containing 5-6% stearic acid) | 12.0 | 20.0 |
| Methylated Methylol Melamine (80% solution) | 50.0 | 25.0 |
| KOH | 0.12 | 0.18 |
| Sodium isopropyl naphthalene sulfonate | 0.84 | 0.64 |
| Water | 29.12 | 46.2 |
| Ammonia | 8.0 | 8.0 |
| Total | 100.1 | 100.0 |
| Effective total solids | 52.0 | 40.0 |

These compositions were prepared by the above described process, using mechanical agitation and positive cooling of the hot solutions to obtain rapid formation of finely divided stearamide crystals. They were easily dispersible in water, even after storage for a period of 3 months, and produced a high degree of water repellency when applied to cottoncloth and cured in the usual manner.

From the foregoing description of preferred embodiments of the invention it is evident that all the objects thereof have been accomplished. A higher fatty acid amide-methylated methylol melamine composition of fine particle size and good water-dispersibility is prepared by a method that is particularly well suited for practice on a large industrial scale. This method avoids the use of ethyl alcohol and other organic solvents which had previously been considered necessary to dissolve the higher fatty acid amide. The composition therefore produces an increased degree of water repellency when applied to textiles, as compared with similar compositions containing substantial quantities of organic solvent.

What we claim is:

An autodispersible water-repellent composition for textiles consisting of:

|  | Per cent |
|---|---|
| Stearamide | 11.4 –19 |
| Methylated methylol melamine (80% aqueous solution) | 50 –25 |
| Alkali metal stearate | 0.6 – 1.2 |
| Sodium isopropyl naphthalene sulfonate | 0.84– 0.64 |
| Ammonia | 8 |
| Water | 29.16–46.2 |

GEORGE I. CATHERS.
LINTON A. FLUCK, Jr.

REFERENCES CITED

The following references are of record in the file of this patent:

UNITED STATES PATENTS

| Number | Name | Date |
|---|---|---|
| 2,357,273 | Thurston | Aug. 29, 1944 |